May 12, 1925.
L. G. RILEY
CONTROL APPARATUS
Filed Feb. 14, 1921
1,537,695
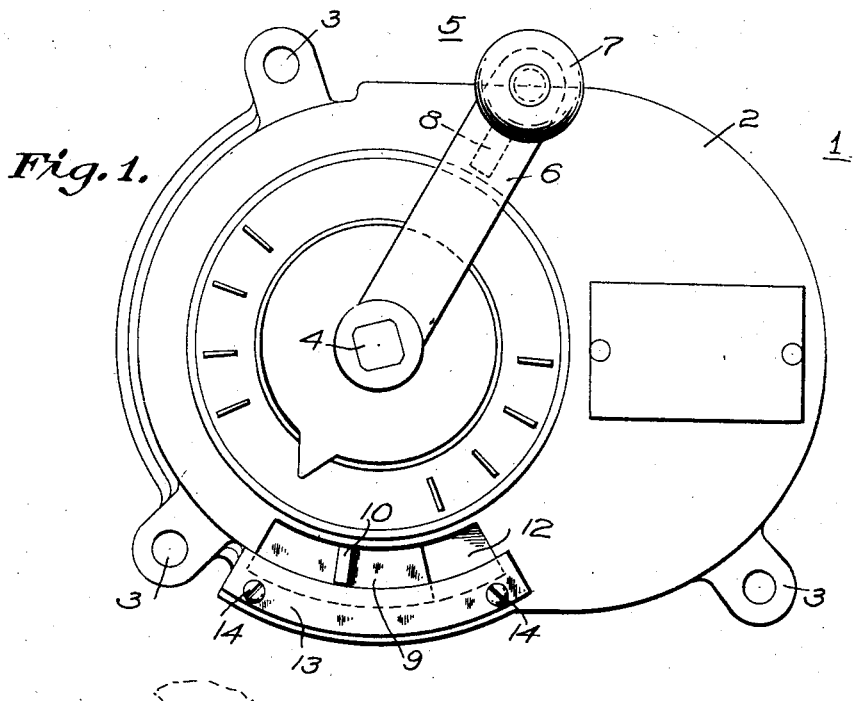
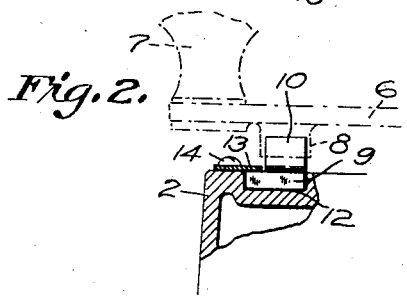
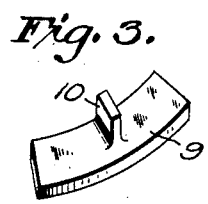
WITNESSES:
INVENTOR
Lynn G. Riley,
BY
ATTORNEY Patented May 12, 1925.

1,537,695

UNITED STATES PATENT OFFICE.

LYNN G. RILEY, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL APPARATUS.

Application filed February 14, 1921. Serial No. 444,922.

*To all whom it may concern:*

Be it known that I, LYNN G. RILEY, a citizen of the United States, and a resident of Wilkinsburg, in the county of Allegheny and State of Pennsylvania, have invented a new and useful Improvement in Control Apparatus, of which the following is a specification.

My invention relates to control apparatus and has particular relation to controllers which are required to govern motor-control systems.

The object of my invention is to provide a controller having a shaft which may be rotated through a predetermined angle that is greater than one complete rotation of the shaft.

Heretofore, a shaft could be rotated an indefinite number of times or, if there was a stop member to limit its travel, it could not make one complete rotation.

In the development of controllers, it has now become desirable to be able to rotate the shaft of a controller through an angle of more than 360 degrees to provide for a proper sequence of operations of a motor-control system.

Briefly speaking, my invention comprises a movable stop member which is slidably mounted upon a controller, and a handle of the master controller to engage the stop member and move it circumferentially, thereby permitting the controller handle and the shaft actuated thereby to make more than one complete rotation.

For a better understanding of my invention, reference should be made to the accompanying drawing, Figure 1 of which is a view, in plan, of a controller;

Fig. 2 is a view, partly in side elevation and partly in section, of a portion of the apparatus employed in Fig. 1; and Fig. 3 is a view, in perspective, of a detail of the apparatus shown in Figs. 1 and 2.

Referring particularly to Fig. 1, a master controller 1, having a cover member 2, is provided with the usual lugs 3 for securing it to a supporting body (not shown). The controller is provided with a rotatable shaft 4, upon which is mounted a handle 5, comprising an arm or shank 6 and a knob or grip 7.

Upon the under side of the arm 6 is a lug or projection 8, which, upon the rotation of the handle 5 through a sufficient angle, engages a movable stop member 9. The stop member 9 (shown best in Fig. 3) is a flat arcuate member having a single projection 10 upon its upper side. The projection 10 is located substantially midway between the ends of the stop member 9. The movable stop member 9 is positioned within a groove or recess 12 in the cover 2 of the master controller 1 (see Fig. 2). It is maintained in this position by an overlapping flat arcuate member 13, which is rigidly secured to the cover 2 by means of screws 14.

The operation of my invention may be described as follows: Upon actuating the controller handle 5 in a counter-clockwise direction until the lug 8 thereof engages the lug or projection 10 of the arcuate member 9, thereby causing the member 9 to move in a counter-clockwise direction until the limit of travel of the member 9 within the groove 12 has been reached. When the handle 5 is in this position, the controller 1 occupies the "Off" position.

The controller handle 5 may be reversed, that is, actuated in a clockwise direction, until a complete revolution, minus the thickness of the projection 10, is made. The lug 8 is then in position to engage the projection 10 of the arcuate member 9 and cause it to move in a circumferential path until the member 9 has arrived at its limit of travel within the groove 12 of the cover 2. The distance the member 9 travels may be increased or decreased by increasing or decreasing the arcuate length of the groove 12.

It is to be understood that the arcuate member 9 could be actuated by any rigid member which is secured to the rotatable shaft 4, although it is considered most convenient to have it actuated by the controller handle 5.

While I have shown my invention in a preferrd form, it is apparent that modifications may be made within the spirit and scope of my invention, in the shape and position of the stop member and in the position and shape of the rotatable member by which it is engaged. I desire, therefore, to be limited only by the scope of the appended claims.

I claim as my invention:

1. The combination with a rotatable shaft, of a cover member through which said shaft extends, a rigid member secured to said shaft above said cover member, a recess in said cover member, a movable member disposed in said recess, and a projecting lug carried by the movable member for stopping the rotation of said rigid member and said shaft after said shaft has been rotated through a predetermined angle of more than 360°, said movable member being actuated by said rigid member through a predetermined angle.

2. The combination with a rotatable shaft, of a cover member through which said shaft extends, said cover member having a recess therein, a rigid member secured to said shaft, an arcuate member disposed in said recess and adapted to be actuated by said rigid member, and means for limiting the movement of said arcuate member through a predetermined angle.

3. In a controller, in combination, a rotatable controller-operating member and means to limit the angular movement of the operating member, said means comprising a slotted controller-casing cover, a member movable relative to the cover and extending through the slot in the cover into the path of the controller-operating member, thereby to limit the rotation of said operating member.

4. The combination with a controller having a casing member shaft and a handle for actuating said shaft, of an arcuate member slidably mounted within said casing member, said arcuate member having a projection for engaging said handle.

In testimony whereof, I have hereunto subscribed my name this 28th day of January, 1921.

LYNN G. RILEY.